Oct. 9, 1928.
J. MOSCRIP
1,687,463
JUICE EXTRACTOR
Filed April 23, 1926  2 Sheets-Sheet 1
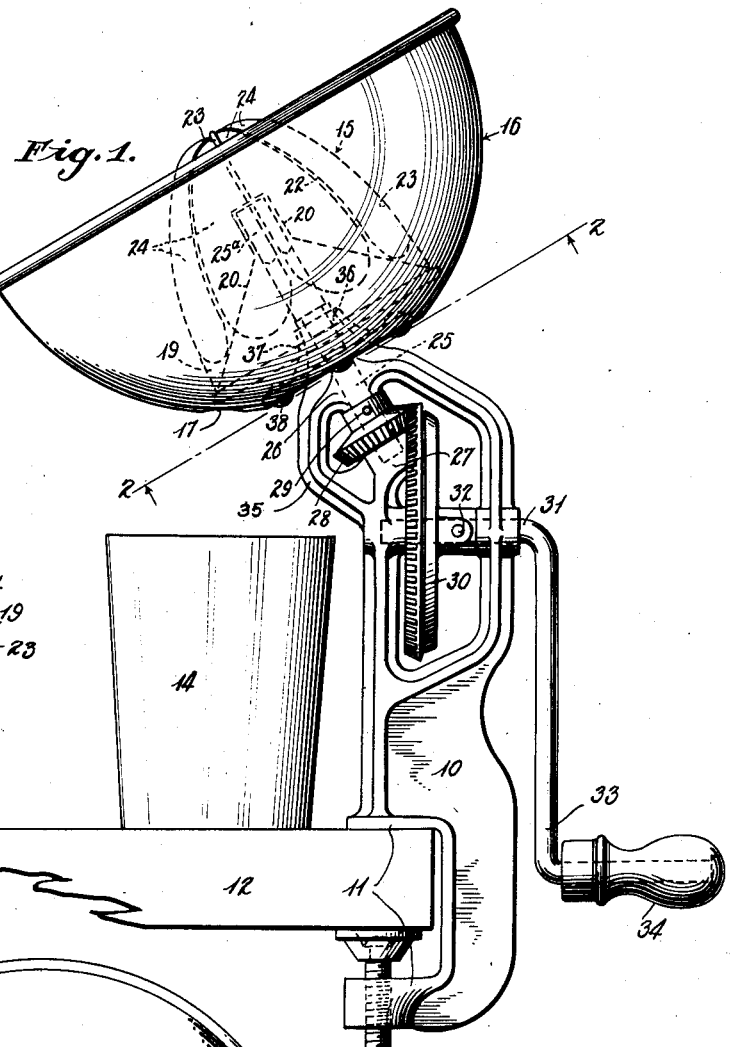
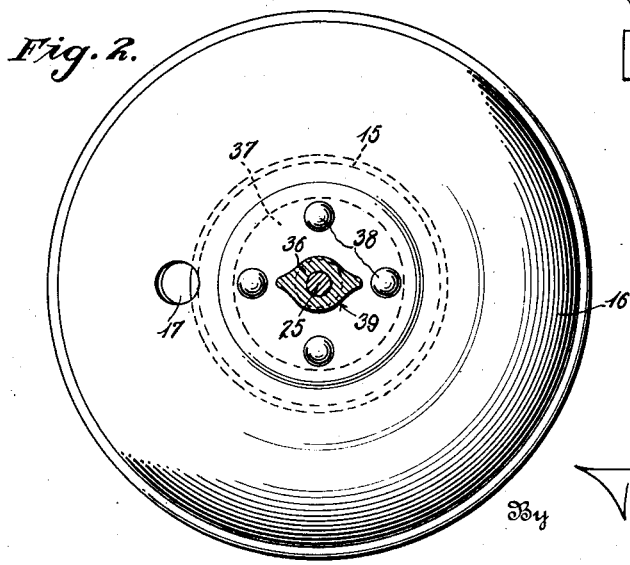

Oct. 9, 1928.  
J. MOSCRIP  
JUICE EXTRACTOR  
Filed April 23, 1926  
1,687,463  
2 Sheets-Sheet 2
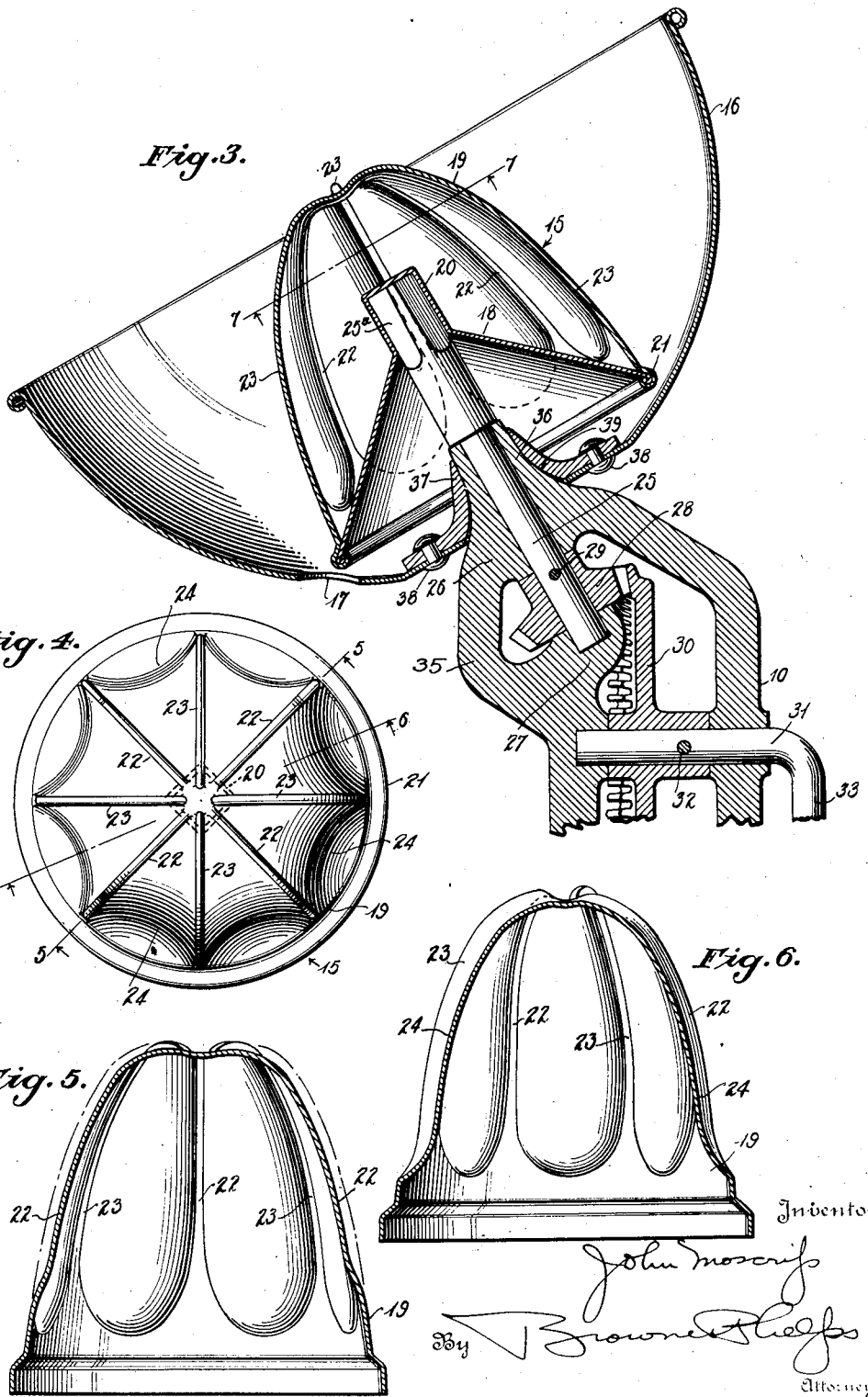

Patented Oct. 9, 1928.

1,687,463

UNITED STATES PATENT OFFICE.

JOHN MOSCRIP, OF TAMPA, FLORIDA, ASSIGNOR TO FLORIDA CITRUS EXCHANGE, OF TAMPA, FLORIDA, A CORPORATION OF FLORIDA.

JUICE EXTRACTOR.

Application filed April 23, 1926. Serial No. 104,039.

This invention relates to an extractor for the juice and pulp of citrous fruits and primarily limes, lemons, oranges and grapefruit.

Aside from the aim to generally render a device of this character more efficient, simple, durable and inexpensive, objects are to provide a novel form of extractor head improved with respect to its formation in a plurality of parts, to the extracting ribs thereof and to its fastening; to produce an apparatus wherein the axis of the main parts is inclined, to facilitate operation, compact mounting of the parts and drainage and collection of the extracted matter, and to invent a construction wherein the removable bowl is in a novel manner efficiently held on the mounting bracket against accidental turning.

Additional objects and advantages will become apparent from a consideration of the description following taken in connection with accompanying drawings illustrating an operative embodiment.

In said drawings:

Fig. 1 is a view of the device in side elevation in connection with a fragment of a support and a receptacle for extracted matter;

Fig. 2 is a sectional view taken on the line 2—2 of Fig. 1;

Fig. 3 is a central vertical sectional view on the enlarged scale taken through the upper parts of Fig. 1;

Fig. 4 is a plan view of the extractor head;

Fig. 5 is a cross sectional view taken on the line 5—5 of Fig. 4;

Fig. 6 is a cross sectional view taken on the line 6—6 of Fig. 4, and

Fig. 7 is a cross sectional view taken on the plane of the line 7—7 of Fig. 3.

Referring specifically to the drawing wherein like reference characters designate like or corresponding parts, 10 designates a mounting bracket of skeleton form preferably being a metallic casting, mostly conventional of a form of means to mount the operative parts. Said bracket, for example, may have coacting jaws 11 to receive an edge of a table or the like 12 to which the bracket may be detachably fastened by a clamp screw 13 which is threaded in one of said jaws.

Said table 12 may support a glass, tumbler, or other receptacle 14; so arranged as to receive juice and pulp extracted from fruit by a head 15, caught by a bowl 16 and draining from the latter through an eccentrically arranged outlet opening 17.

Referring specifically to the extractor head 15, it is made in two imperforate sections 18 and 19. Section 18 is a closure for section 19 and forms an attaching base. Said section 18 is generally conical and has a closed square or otherwise non-circular socket extension 20 at its apex, the cone shape serving as a guide to facilitate engagement of the socket and operating mechanism. Section 19 is also generally conical but with a curved taper and longer than and encloses the section 18. Said sections 18 and 19 are rigidly attached together at their bases with the former constituting a closure for the latter by spinning or otherwise at 21 which results in clinching the sections together with a water tight joint.

The section 19 has exterior, equi-distantly spaced extracting ribs 22 and 23 which due to the conical form of the head are closer together at the apex than at the base of the cone, said ribs at the apex terminating in any suitable manner preferably short of each other to avoid undue bulk or provision of an undesirable point which might prematurely puncture the skin of the fruit. Valleys or grooves 24, usually transversely arcuate, are formed between the ribs 22 and 23.

Particular attention is directed to the fact that the ribs 22 and 23 are alternately arranged and that ribs 23 project outwardly farther than the ribs 22, as well shown in Figures 5 and 6. The ribs 22 join the base of section 18 along curved lines 24. This construction in effect provides an undulatory surface which engages the interior of the fruit and finally the skin, serving to flex the skin for more efficient scraping and extracting of the juice and pulp. By way of example, section 19 may be of aluminum and section 18 of rust-proof sheet iron or other metal which also materially reenforces section 18. Many of the novel features may be practiced in other forms of heads and even in a one piece head, irrespective of the material used and for instance, metal, glass, or wood.

A removable inclined shaft 25 carries the head 15 and particularly has a square or non-circular portion 25ª detachably and in a friction-tight manner engaged by the socket 20 of the head. The conical wall of section 18 serves as a guide for abutment by portion 25ª in the engagement of said socket 20 and head 25. Said shaft is journaled in spaced bearings 26 and 27 forming integral parts of bracket 10. Between said bearings 26 and 27 a bevel gear wheel 28 is disposed and rigidly and detachably connected to the shaft by a removable pin 29 which also secures the shaft 25 against accidental displacement. Meshing with gear wheel 28 is a main bevel gear wheel 30 located in an opening in the bracket and detachably fastened to an operating shaft 31 journaled in bracket 10 by a removable pin 32. Said pin 32 in combination with gear wheel 30 serves to fasten shaft 31 against detachment. A portion of shaft 31 is formed into an operating crank 33 preferably equipped with a swivel hand grip 34.

To accommodate shaft 25, the upper portion 35 of bracket 10 is an overhanging or lateral offset. Said portion 35, which includes the bearing 26 is upwardly extended into a shank 36 whch is elliptical or otherwise non-circular in cross section. In the bowl 16 centrally of and to its bottom a collar 37 is riveted or otherwise fastened as at 38. The said collar 37 and bottom wall of bowl 16 have a central opening or socket 39. Said opening or socket 39 and rim of the bowl are located above opening 17 in the operative position of the bowl. Opening or socket 39 is non-circular in cross section and in fact of the same contour as the shank 36 so that when the bowl is applied thereto, it will be held against turning movement independently thereof. The bowl is accordingly removably mounted and is held in place by a frictional engagement of the surfaces of shank 36 and socket 39.

Above shank 36, shaft 25 is thickened or enlarged where it is provided with the aforesaid square portion 25, so as to be seated on said shank.

The same head 15 may be used in connection with various citrous fruits and particularly limes, lemons, oranges and grapefruit.

Initially the fruit is halved and a half at a time is held in one hand with the pulp against the head 15 while the operator engages grip 34 with the other hand. Crank 33 is turned to rotate shaft 31, gears 30 and 28, shaft 25 and accordingly the head 15. The operator holds the fruit against turning and maintains a pressure thereon urging it toward the base of head 14 whereby the juice and pulp is gouged and removed, facilitated by the particular ribs 22 and 23, the extracted material passing from the head through valleys 24 into bowl 16 and thence through opening 17 to the receptacle 14. The parts may be readily disassembled for cleaning.

Various changes may be resorted to provided they fall within the spirit and scope of the invention.

I claim as my invention:—

1. An extractor head of the class described comprising an imperforate extracting section and an imperforate closure section therefor, said sections being of sheet material and spun together at their edges to form a liquid-tight joint and the closure section being formed into an integral socket at its apex for engagement with operating mechanism and said closure section being substantially conical to form a guide in effecting engagement of said socket with operating mechanism.

2. An extractor head of the class described comprising an extracting section and a closure therefor, the closure being formed into an integral attaching means at its apex for engagement with operating mechanism, and the closure being substantially conical to form a guide for effecting engagement of said attaching means with operating mechanism.

JOHN MOSCRIP.